United States Patent [19]

Froniewski et al.

[11] Patent Number: 5,293,623
[45] Date of Patent: Mar. 8, 1994

[54] RANDOM ACCESS MEMORY BASED BUFFER MEMORY AND ASSOCIATED METHOD UTILIZING PIPELINED LOOK-AHEAD READING

[75] Inventors: Jozef Froniewski, Palo Alto; David E. Jefferson, Milpitas, both of Calif.

[73] Assignee: Samsung Semiconductor, Inc., San Jose, Calif.

[21] Appl. No.: 976,719

[22] Filed: Nov. 16, 1992

Related U.S. Application Data

[63] Continuation of Ser. No. 367,362, Jun. 16, 1989, abandoned.

[51] Int. Cl.$^5$ .......................... G06F 12/00; G11C 8/04
[52] U.S. Cl. .................. 395/425; 364/DIG. 2; 364/948.34; 364/231.8; 365/230.04; 365/221; 395/250
[58] Field of Search ............ 395/425, 400, 250; 365/221, 230.03, 230.04, 239, 240, 236; 364/200 MS File, 900 MS File

[56] References Cited

U.S. PATENT DOCUMENTS

| | | | |
|---|---|---|---|
| 3,629,857 | 12/1971 | Faber | 395/425 |
| 4,056,851 | 11/1977 | Hovagimyan et al. | 395/250 |
| 4,270,181 | 5/1981 | Tanakura et al. | 364/736 |
| 4,314,361 | 2/1982 | Jansen et al. | 365/221 |
| 4,433,394 | 2/1984 | Torii et al. | 365/221 |
| 4,597,061 | 6/1986 | Cline et al. | 365/189.01 |
| 4,642,797 | 2/1987 | Hoberman | 365/221 |
| 4,685,088 | 8/1987 | Iannucci | 365/189.02 |
| 4,740,923 | 4/1988 | Kaneko | 365/230.03 |
| 4,809,161 | 2/1989 | Torii et al. | 365/221 |
| 4,817,054 | 3/1989 | Banerjee et al. | 365/221 |
| 4,849,937 | 7/1989 | Yoshimoto | 365/230.04 |
| 4,888,791 | 12/1989 | Malinowski | 365/221 |
| 4,891,788 | 1/1990 | Krefiels | 365/221 |
| 4,933,901 | 6/1990 | Tai et al. | 365/221 |

*Primary Examiner*—Glenn Gossage
*Attorney, Agent, or Firm*—Cushman Darby & Cushman

[57] ABSTRACT

Stored data elements are read from a first-in-first-out (FIFO) buffer memory in a pipelined fashion. A look-ahead fetching technique is utilized during a memory read cycle operation to advance (select) a subsequent data element in preparation for a next read command. Data read in advance is not output, however, until a subsequent read cycle corresponding to a next request for data in the buffer memory. A first data element written into the buffer memory is stored in an initial data register. Upon a first read request, the first data element is output from the initial data register. A first and a second memory array are provided for alternately storing successive ones of data elements written into the buffer memory. While a presently requested data element from the first array is being output, a memory cell in the second array, which contains the next data element to be requested, is selected and sensed, and the sensed value placed on an output line. Upon receipt of a next request, the value maintained on the output line is output, and a memory cell in the first array, containing the next data element to be requested, is selected and sensed, and that sensed value is placed on a different output line. Such a sequence continues for successive read requests, thus forming a pipelined FIFO buffer memory with look-ahead sensing of memory cells.

17 Claims, 14 Drawing Sheets

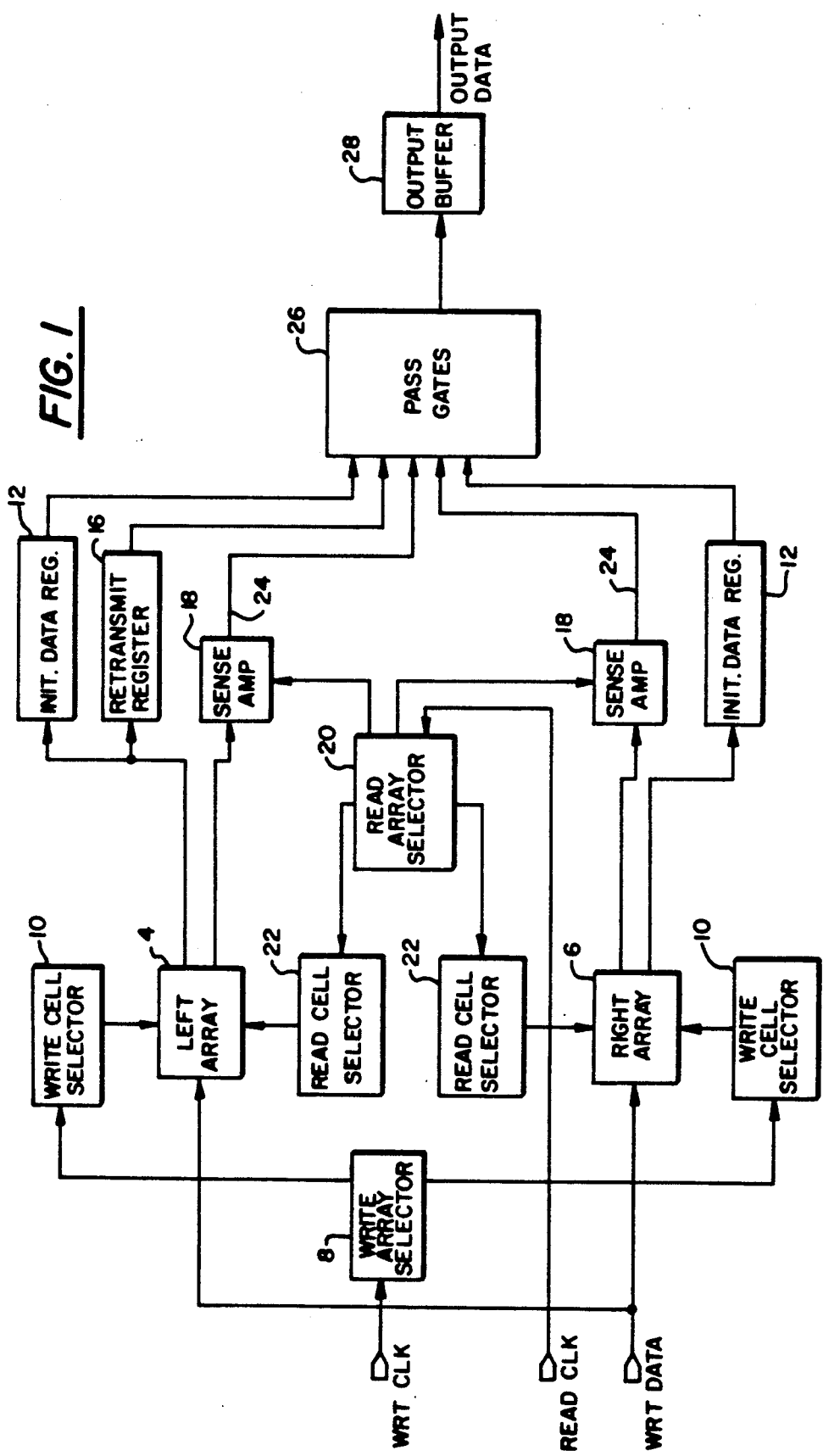

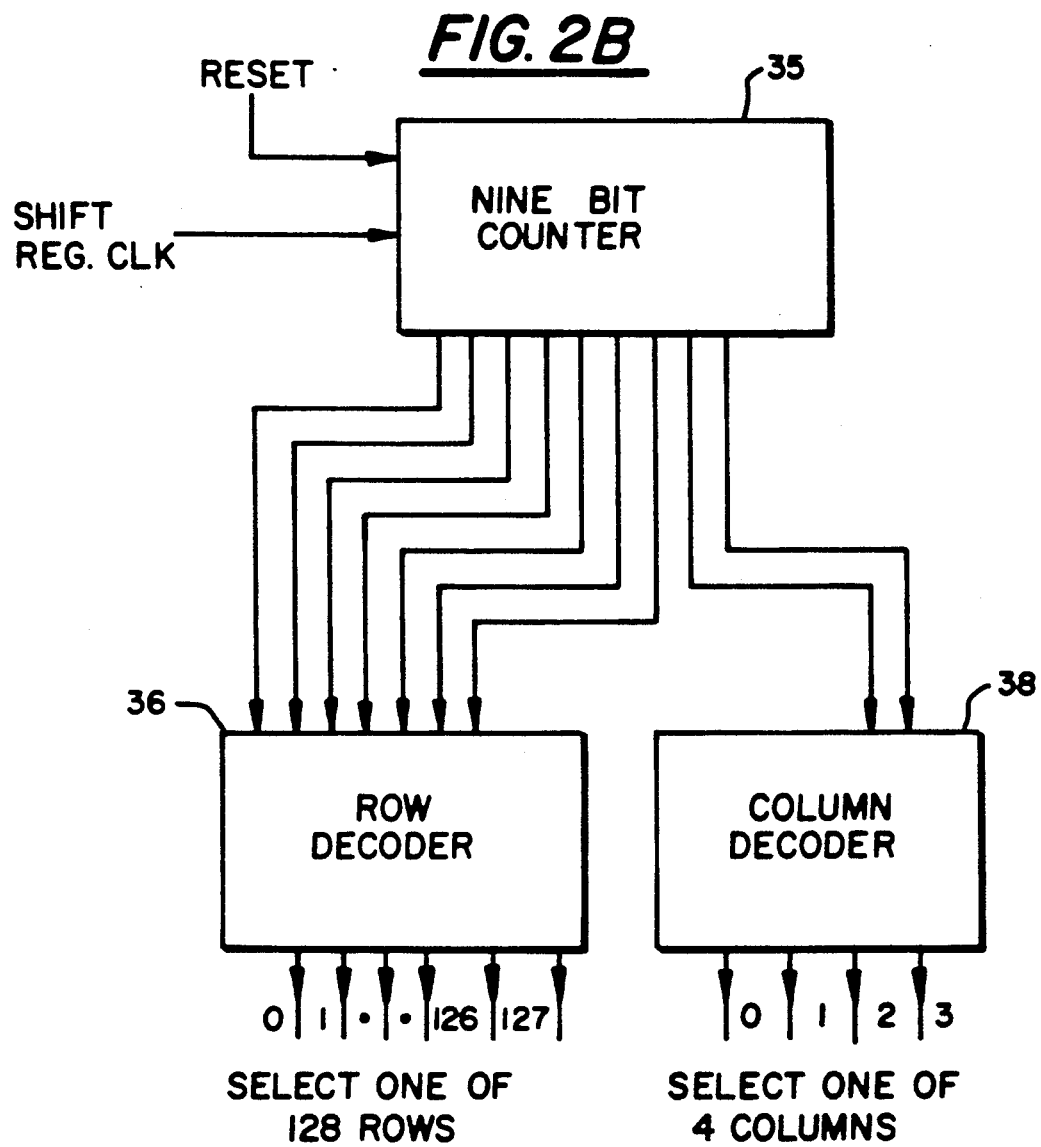

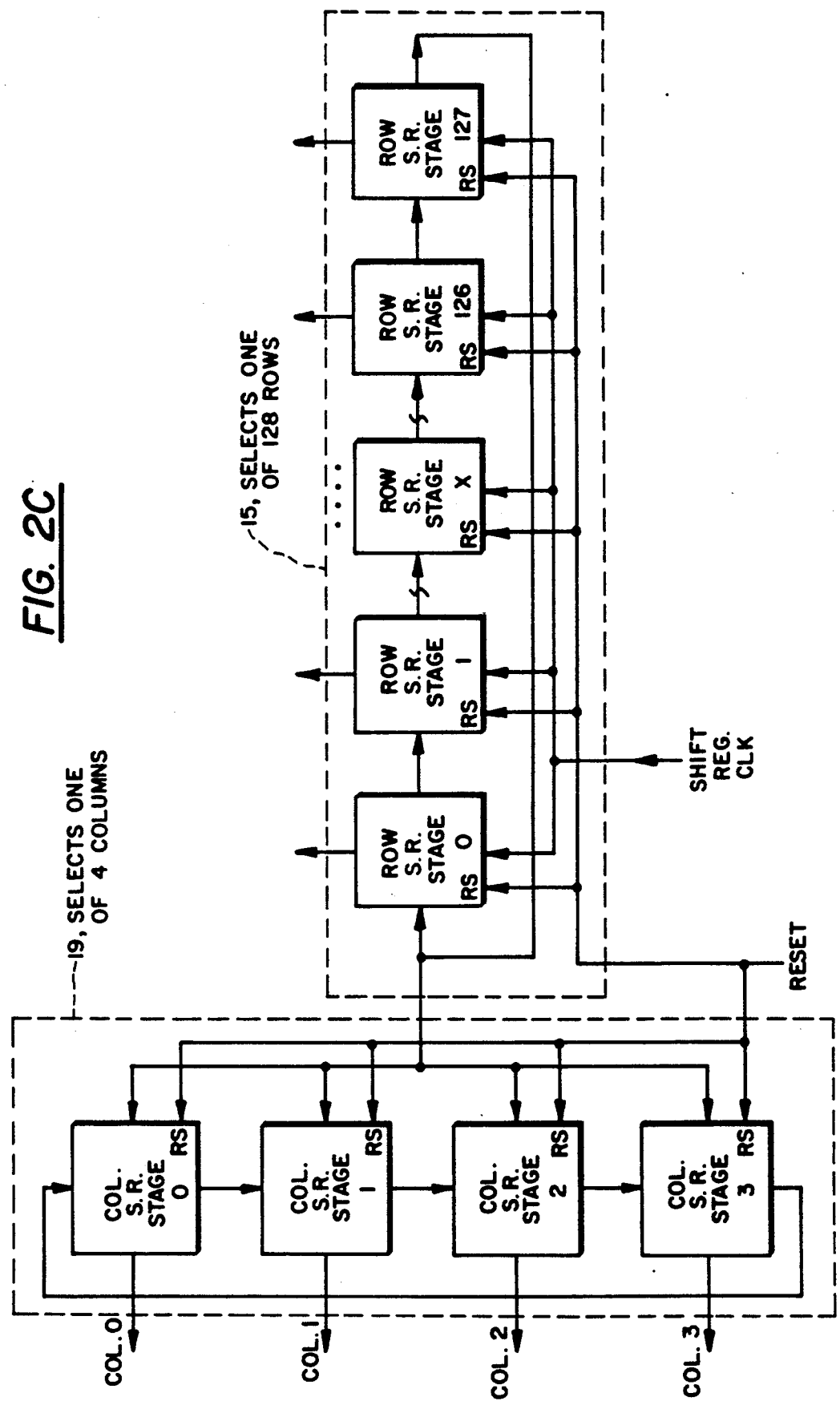

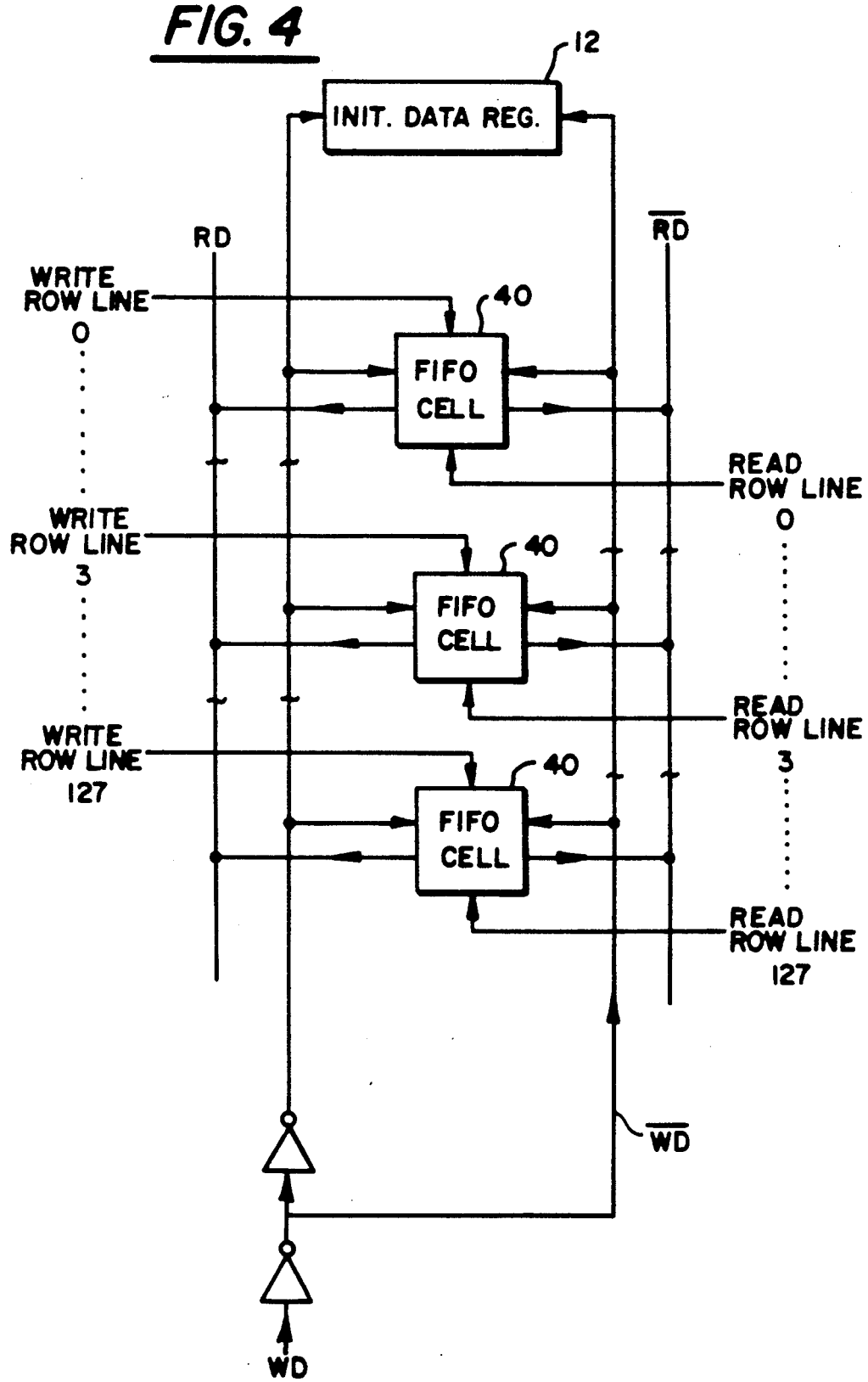

FIG. 10A

RTR TRUTH TABLE

| RETRANSMIT | RTR |
|---|---|
| ⎍ | ⊓ |

FIG. 10B

SEL TRUTH TABLE

| INIT 1 | READ ARRAY SELECT | SEL |
|---|---|---|
| 0 | ⎍ | 0 |
| 1 | ⎍ | ⊓ |

FIG. 10C

INDW TRUTH TABLE

| SEL | IND | WRITE ARRAY SELECT | INDW |
|---|---|---|---|
| 0 | 0 | 0 | 0 |
| 0 | 1 | 0 | 0 |
| 1 | 0 | 0 | 0 |
| 1 | 1 | 0 | 0 |
| ⊓ | 0 | 1 | 1 |
| 0 | ⊓ | 1 | 1 |
| 0 | 0 | 1 | 0 |
| ⊓ | ⊓ | 1 | 1 |

FIG. 10D

INIT 1 TRUTH TABLE

| INPUTS | | | OUTPUTS | |
|---|---|---|---|---|
| EMPTY | OUTPUT FROM READ ARRAY SELECT | RETRANSMIT | INIT 1- (LEFT) | INIT 1- (RIGHT) |
| 0 | X | X | 0 | 0 |
| 1 | ↴ | 1 | 0 | 1 |
| 1 | 1 | ↴ | 0 | 1 |
| 0 | X | X | 1 | 0 |
| 1 | ↴ | 1 | 1 | 1 |
| 1 | 1 | ↴ | 1 | 1 |

FIG. 10E

RTW TRUTH TABLE

| OUTPUT FROM WRITE ARRAY SELECTOR | ANDed OUTPUT FROM WRITE CELL SELECT | RTW |
|---|---|---|
| 0 | 0 | 0 |
| 0 | 1 | 0 |
| 1 | 0 | 0 |
| 1 | 1 | 1 |

FIG. 10F

INDR TRUTH TABLE

| EMPTY | RETRANSMIT | WRITE ARRAY SELECT | READ ARRAY SELECT | INDW | INDR |
|---|---|---|---|---|---|
| x | x | x | x | — | 0 |
| — | x | x | x | x | 0 |
| x | ⌐ | x | x | x | 0 |
| x | x | x | 0 | x | 0 |
| x | 0 | x | x | x | 0 |
| 0 | — | — | — | 0 | 0 |
| ⌐ | — | ⌐ | 0 | ⌐ | 0 |
| ⌐ | — | ⌐ | — | ⌐ | ⌐ |

RANDOM ACCESS MEMORY BASED BUFFER MEMORY AND ASSOCIATED METHOD UTILIZING PIPELINED LOOK-AHEAD READING

This is a continuation of application Ser. No. 07/367,362, filed on Jun. 16, 1989, which was abandoned upon the filing hereof.

BACKGROUND AND FIELD OF THE INVENTION

This invention relates to the field of serial memories. Such memories are typically used as buffer memories to receive input data elements at one rate, and to output at a different rate the stored data elements in a sequence defined by the order in which they were written into the buffer memory. Generally, there are two types of such buffer memories. One type is based on shifting data elements through multiple cells in the buffer memory. The other type is random access memory (RAM) based, not requiring shifting of data elements through multiple cells. This invention specifically relates to RAM based serial memories. In prior art buffer memories of that type, the time required to complete a read is long, because the particular memory cell containing a requested data element must be selected (memory cell activated and stored signal imparted onto data bit lines), and the imparted signal must be sensed by an amplifier before the data element can be outputted from the buffer memory. Thus, the access time in such prior art systems is long.

SUMMARY OF THE INVENTION

This invention seeks to reduce the access time for outputting each data element in a serial memory by pipelining the memory read operation. Accordingly, within a memory read cycle corresponding to a present request for one data element stored in the serial memory, the reading operation for the memory cell containing a data element to be outputted in response to a subsequent read request is commenced. The memory cell containing the data to e subsequently requested is selected within the present memory cycle.

According to a more detailed embodiment, the memory cell containing the next to be requested is also sensed from the selected cell and made available within the present read cycle. Thus, in a preferred embodiment, the presently requested data element can be outputted without a need to select or to sense a memory cell containing that data element. Also in the preferred embodiment, the serial buffer memory is a first in first out (FIFO) buffer memory. Through pipelining, this invention implements advanced look-ahead reading of a memory cell before the occurrence of a read request for the data element contained in that memory cell.

BRIEF DESCRIPTION OF THE DRAWINGS

FIG. 1 illustrates a partial overall view of a system according to a preferred embodiment of this invention.

FIGS. 2A, 2B, and 2C each illustrate a serial selector to implement the write or read cell selector shown in FIG. 1.

FIG. 4 is an illustration of a preferred embodiment showing a memory array pass-through connection between an inputted data element and an initial data register.

FIGS. 10A-10F are respective I/O tables for functional blocks RTR, SEL, INDW, INIT 1, RTW, and INDR shown in FIG. 7.

DETAILED DESCRIPTION

Figure 2A:
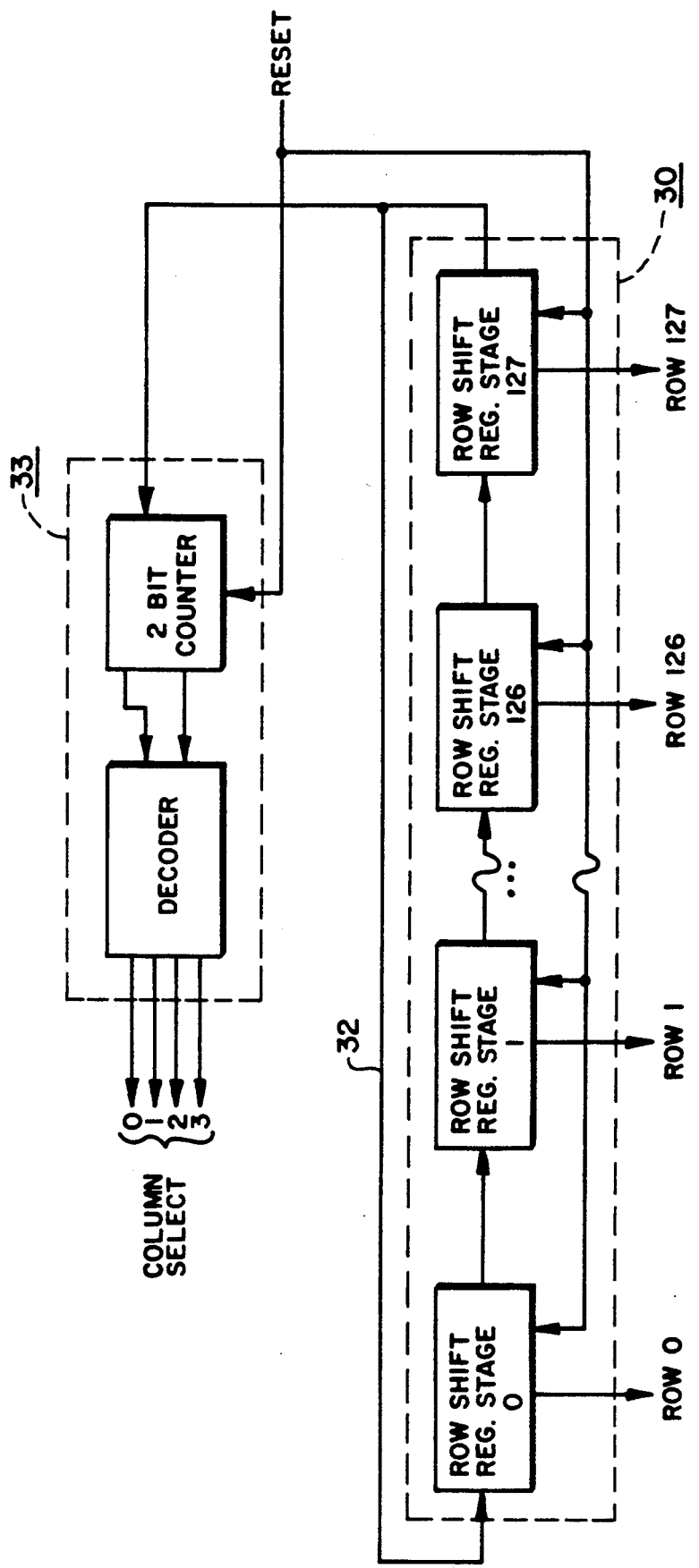

A buffer memory is shown in part in FIG. 1 which implements a preferred embodiment of the present invention. It is a FIFO buffer memory and therefore data elements are outputted from the buffer memory in the same order as that in which they were first written into the buffer memory. There is a left memory array 4 and a right memory array 6, each being identical in construction and of the same depth and width. For illustration purposes only, each array has 4 columns of memory cells, each being 128 cells deep, and each cell being capable of holding a nine bit data element.

Write operations in the buffer memory will now be discussed. In each write cycle, a different one of the arrays is activated for storing a corresponding data element, and within each array, data elements are stored in cells related by a respective predetermined sequence. For instance, successive data elements are stored first in cell 1 of the left array; then cell 1 of the right array; then cell 2 of the left array 4; then cell 2 of the right array; then cell 3 of the left array; then cell 3 of the right array; and so on. The array selection for writing is accomplished by a write array selector 8. The write array selector 8 is responsive to write signals on the write clock line WRT CLK each defining a write cycle corresponding to a particular data element to be written into the buffer memory through a WRT DATA line in that cycle, to alternate between the left and right arrays in consecutive write cycles. The write array selector can be implemented in many ways, including the use of a divider, counter, shift register, a toggle flip-flop (in the case of the disclosed embodiment), etc; any circuit which can operate to select a different one of the left and right arrays in consecutive write cycles can be used as the write array selector 8. Array cell selection for writing is accomplished by write cell selectors 10, one for each array. The structure of each write cell selector will be later discussed in detail; its function is to select a cell within the associated array according to a predetermined sequence, each time the associated array is selected by write array selector 8. Each array is respectively coupled to a separate initial data register 12 through a write data line WRT DATA passing through the array; the WRT DATA line carries data elements to be stored in the memory arrays. The initial data registers 12 are responsive to respective signals IDWL (initial data write left) and IDWR (initial data write right) from a gating logic 14 (shown in FIG. 6 and in more detail in FIG. 7) to receive and to store the first of a series of data elements to be written into the buffer memory in a corresponding array selected by the write array selector 8. The first data element is also stored in an initial data register 12 associated with the memory array selected by the write array selector 8. For example, if array selector 8 is set to start from the left array, then the data element written into cell 1 of the left array 5 is also passed by line WRT DATA through the array to the initial data register connected to the left array and stored therein. If array selector 8 is set to start from the right array, then the data element to be written into cell 1 of the right array is also passed by line WRT DATA through the array to the initial data register connected to the right array and stored therein.

In an alternative embodiment, the data element written into an initial data register 12 is not written into a memory cell. And in a further alternative embodiment, the initial data registers receive data to be stored therein through lines which do not pass through the memory arrays. It is noted that the pass-through connection reduces busing requirements and minimizes undesirable loading effects. In a further embodiment, only one initial data register is used, and both memory arrays are connected to the same initial data register.

As should be readily apparent, the pipeline is 'preloaded' by location. During a read operation, the first data element is read from the initial data register, thus skipping over the first cell of the left memory array. The first cell read is in the right memory array. Reading from the initial data register avoids latency associated with using the memory cell-to-sense amplifier path. The initial data register is also loaded during reset, because the initial data register is always loaded when writing to the first cell.

As should be clear, this description assumes that the left memory array is designated as the starting point for the first cell. The right array could be designated as the starting point instead, in which case the initial data register will be associated with the right array. Only one initial data register is necessary.

A retransmit register 16 is connected to a memory array first to be selected by the array selector 8. For illustration purposes, the retransmit register is shown as being connected to the left array 4. The retransmit register is responsive to a signal RTW (Retransmit Write) from gating logic 14 to receive and store a data element being written into the left array 4. In this embodiment, the data element to be stored in the retransmit register is received from the same line as that carrying the data element to the initial data register connected to the same array. In an alternative embodiment, the retransmit register and its associated operations are omitted entirely.

Read operations in the buffer memory will now be discussed in connection with the embodiment illustrated in FIG. 1. Because the buffer memory is a FIFO memory, the sequence in which the data elements are outputted from the buffer memory is the same as the sequence in which they were written into the buffer memory.

In each read cycle, a memory cell in a different one of the arrays is selected and sensed for reading a data element therein. However, the element being read from the memory cell is not the data element to be outputted in the present read cycle, but the data element to be outputted in the next read cycle. Because reading a memory cell includes selecting the cell (activating the memory cell thus imparting the stored data signal onto data bit lines), and sensing imparted signals by a sense amplifier, it requires relatively much longer time as compared to simply outputting a data element from a register or from an output line. The buffer memory is pipelined by reading in advance a memory cell containing the next data element to be requested, thus making that data element available on an output line, prior to the initiation of a read cycle in response to a request for that data element. Because each data element is read in advance, when there is a read request for a data element, the requested data element is outputted without reading the memory cell containing that data element, that is, without selecting that memory cell and also without sensing that memory cell in the read cycle initiated by the read request. The selecting and sensing of a memory cell containing the data element presently requested are already completed within a memory read cycle immediately prior to the read cycle initiated by the present request. Thus, the entire reading operation for a data element is performed in advance, and the data is already made available on an output line when a request is received for that data element.

In alternative embodiments, the data element sensed from a memory cell, instead of being maintained on an output line, can be stored in a register or in flip-flops. In a further alternative embodiment, the pipelined look-ahead may be limited to simply selecting the memory cell containing the next data element, while sensing of the selected memory cell is still executed subsequent to receipt of a request for that data element.

In the preferred embodiment, because the first data element is already stored in an initial data register 12, it can be outputted without reading a memory cell in any read cycle. But each subsequent data element is read in a read cycle immediately prior to the request for the data element contained therein, from a memory cell in which it has previously been written. Thus, each memory array is connected to a separate sense amplifier 18 (actually a set of amplifiers, one for each bit in the data element contained in the memory cell being sensed) for sensing a selected cell. Array selection for sensing a memory cell therein is accomplished by a read array selector 20. The read array selector can be implemented in the same many ways as the write array selector can be. In the disclosed embodiment, it is in the form of a toggle flip-flop. The read array selector is responsive to read signals on the read clock line READ CLK each defining a read cycle to alternate between left and right arrays in consecutive read cycles. Array cell selection for sensing is accomplished by read cell selectors 22, one for each array. The structure of each read cell selector will be later discussed in detail; its function is to select a cell within the associated array according to a sequence corresponding to the sequence in which data elements were written into the associated array, each time the associated array is selected for a sensing operation by the read array selector 20. Each sense amplifier 18 is also responsive to a select signal from the read array selector for sensing a cell selected by read cell selector 22 of the same array. The sensed value from a memory cell is maintained by each sense amplifier on an associated output line 24. The outputs of the initial data registers 12 and of the retransmit register 16, and both output lines 24 from sense amplifiers 18 are separately connected to a set of pass gates 26. Pass gates 26 are controlled by gating logic 14 (shown in FIG. 6 and in more detail in FIG. 7) to couple only a single selected output in each read cycle to an output buffer 28——from one of the initial data registers, the retransmit register, or one of the output lines 24.

In the first read cycle, the data element to be read is outputted from the initial data register in which the first data element was previously stored when written into the buffer memory. Also in that first read cycle, the next data element to be outputted (in the second read cycle) is read from the first cell in an opposing array (opposite the one to which the initial register outputting data in the current read cycle is connected). The first cell in that opposing array is selected and sensed, and the sense amplified data element is placed on an associated output line 24, all within that first read cycle. Then, in each subsequent read cycle, a previously read data element is outputted from an output line 24, while the next data element to be outputted (in the next read cycle) is read from the next cell in an array opposite the one from which the data element being outputted was read, and placed on an associated output line 24. In that manner, the next data element to be outputted is read (memory cell containing it being selected and sensed and the sensed data placed on an output line) while the current data element is being outputted from an output line. A pipelined FIFO buffer memory with look-ahead sensing is thus achieved.

FIG. 2A illustrates a serial selector which can be used to implement either the write cell selector 10 or the read cell selector 22 of FIG. 1. The serial selector includes a ring pointer having a shift register 30 which is connected end-to-end through recirculating line 32. The shift register has as many stages as there are rows of memory cells in each array; each stage of the shift register corresponds to a particular row of memory cells. A binary bit is initially positioned at a predetermined position within shift register 30, thus pointing to a particular row. Upon each enablement, the pointer bit is shifted one stage within the shift register 30, thus pointing to the next row of memory cells. In this case, shift register has 128 stages from 0 to 127, respectively corresponding to rows 0 to 127 of a memory array. Additionally, the recirculating line 32 is also coupled to a counter/decoder combination 33. For a 4 column memory array implementation, a 2-bit counter is used so that the decoder can output one of 4 selections according to respective counter states. The decoder output selects one of 4 columns in a corresponding array. Each time the pointer bit is recirculated through recirculating line 32, the 2-bit counter is incremented by one. Thus, the recirculating shift register 30 together with the counter/decoder combination 33 serially selects all cells within the associated array (128 cells deep and 4 columns wide). The length of shift register 30 is determined by the number of rows in an associated memory array, and the capacity of the counter/decoder combination is determined by the number of columns of cells in the associated array.

In an alternative embodiment, there may be half as many stages in the shift register as there are numbers of cells in the memory array. In that case, each stage designates a set of two rows and a further predecoded row driver would select a different one of the two rows in successive cycles. Additionally, different ratios of shift register stages to memory cell capacity can be implemented, so long as there are corresponding predecoded row drivers to make one of plural rows designated by each stage of the shift register. This alternative scheme can be utilized whenever a shift register is used for containing a shifting pointer bit.

FIG. 2B illustrates another alternative serial selector which may be used to implement the write cell selector 10 or the read cell selector 22 function of FIG. 1. The serial selector comprises a multi-bit counter 35, a row decoder 36 and a column decoder 38. Counter 35 is incremented each time a corresponding read or write cell selector is enabled by a signal from a corresponding read or write array selector. The least significant bits of the counter output are decoded to address a particular row in a memory array, and more significant bits are decoded to address a particular column in the memory array. For a memory array having 128 rows and 4 columns, a nine-bit counter as shown in FIG. 2B is required. The 7 least significant bits are used for row selection and the 2 most significant bits are used for column selection. The signals from the read and write array and cell selectors may be termed read and write select signals, and data elements are written in the first and second memory arrays in accordance with these select signals.

FIG. 2C illustrates a further alternative serial selector which may be used to implement the write cell selector 10 or the read cell selector 22 of FIG. 1. A first shift register 15 is connected from end to end via a recirculating line 17 for pointing to 1 of 128 rows (shift register 15 having 128 stages), and a second shift register 19 is also connected from end to end via a recirculating line 21 for pointing to 1 of 4 columns (shift register 19 having 4 stages). The recirculating line 17 of shift register 15 connects to the shift register 19 such that shift register 19 is enabled once each time a pointer bit in shift register 15 is recirculated along the recirculating line 17. With this scheme, a pointer bit is located in shift register 15 to point to a particular row, and a pointer bit is located in shift register 19 to point to a particular column.

In the serial selectors discussed above, upon activation the initial position of a pointer bit may serve as an initial selection. In the alternative, upon activation, the selector advances to its next state, and that next state serves as an initial selection.

Figure 3A:
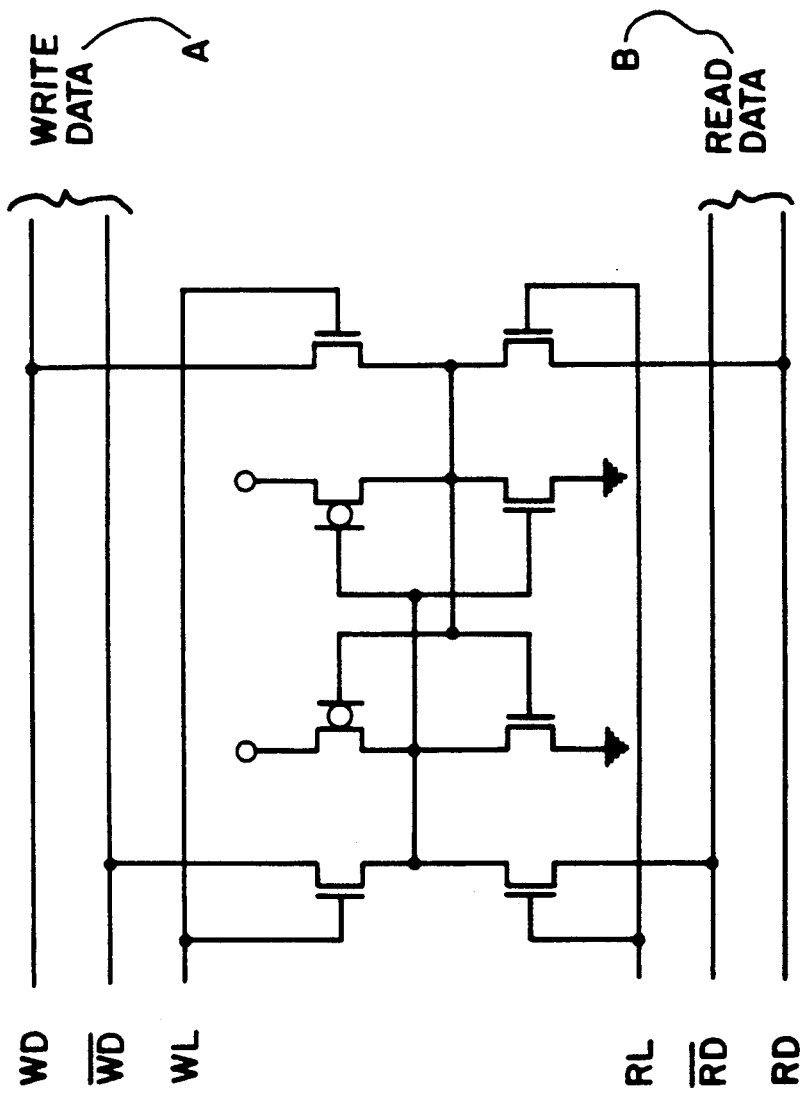
FIGS. 3A and 3B each illustrate a dual port memory cell for use in the memory arrays shown in FIG. 1.
Figure 3B:
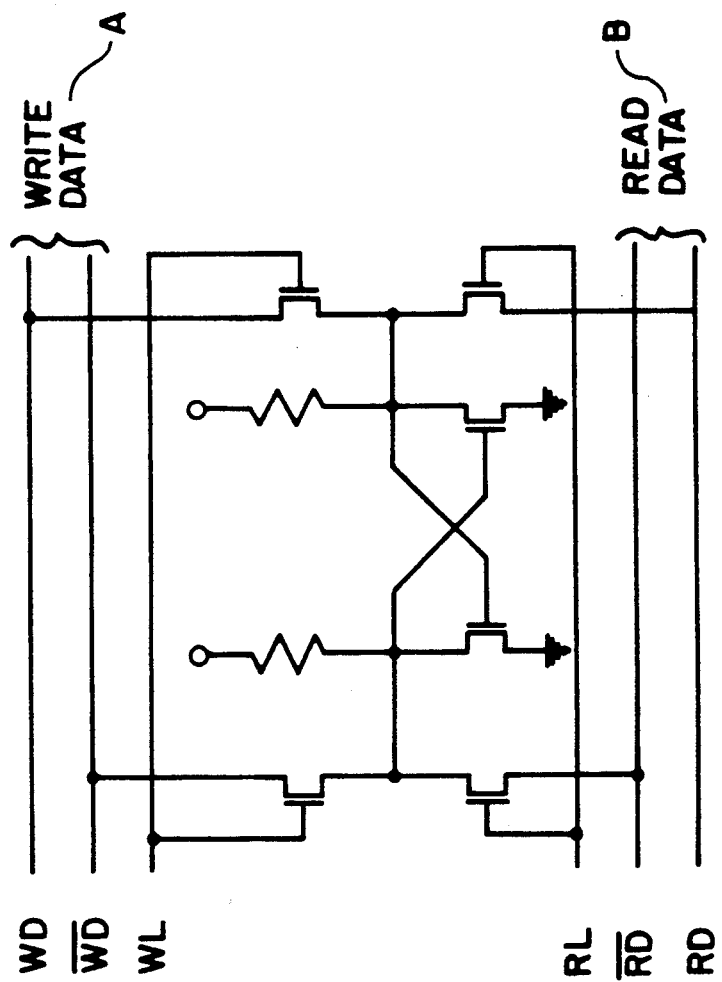

This invention makes use of dual port memory cells to provide synchronous writing and reading from the FIFO buffer memory. One port is used for writing data into the memory cell; thus it is connected to the WRT DATA line. The other port is used for sensing data from the memory cell, and thus is connected to a sense amplifier. FIGS. 3A and 3B illustrate two of many types of dual port memory cells which may be used in the instant invention. As illustrated, port A is connected to the WRT DATA line (WD and $\overline{\text{WD}}$), and port B is connected to a sense amplifier (not shown) through READ DATA line (RD and $\overline{\text{RD}}$). WL represents a signal line from a corresponding write cell selector 10, and RL represents a signal line from a corresponding read cell selector for reading.

Moreover, according to a preferred embodiment, the WRT DATA line (WD and $\overline{\text{WD}}$) passes directly through the memory arrays to connect to a respective initial data register 12. The direct connection is illustrated in FIG. 4. Memory cells 40 coupled to the WRT DATA line represented by separate lines WD and $\overline{\text{WD}}$ which also couple to an initial data register 12.

Figure 5B:
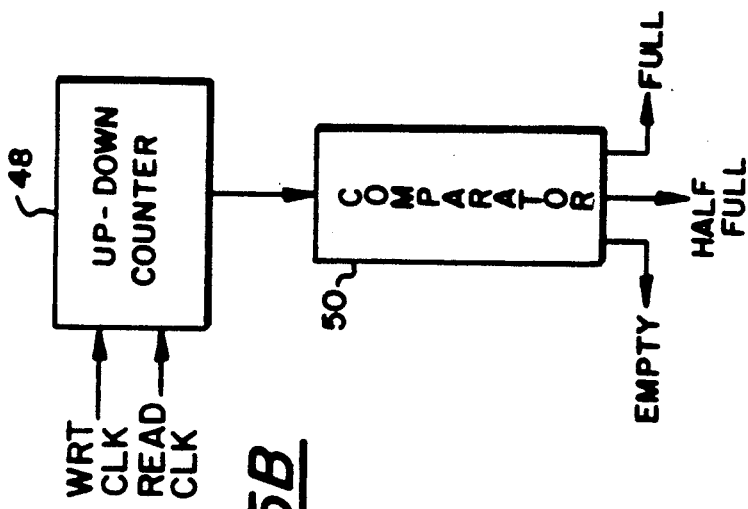
FIGS. 5A and 5B each illustrate a flag indicating circuit to generate status information regarding the state of the buffer memory.
Figure 5A:
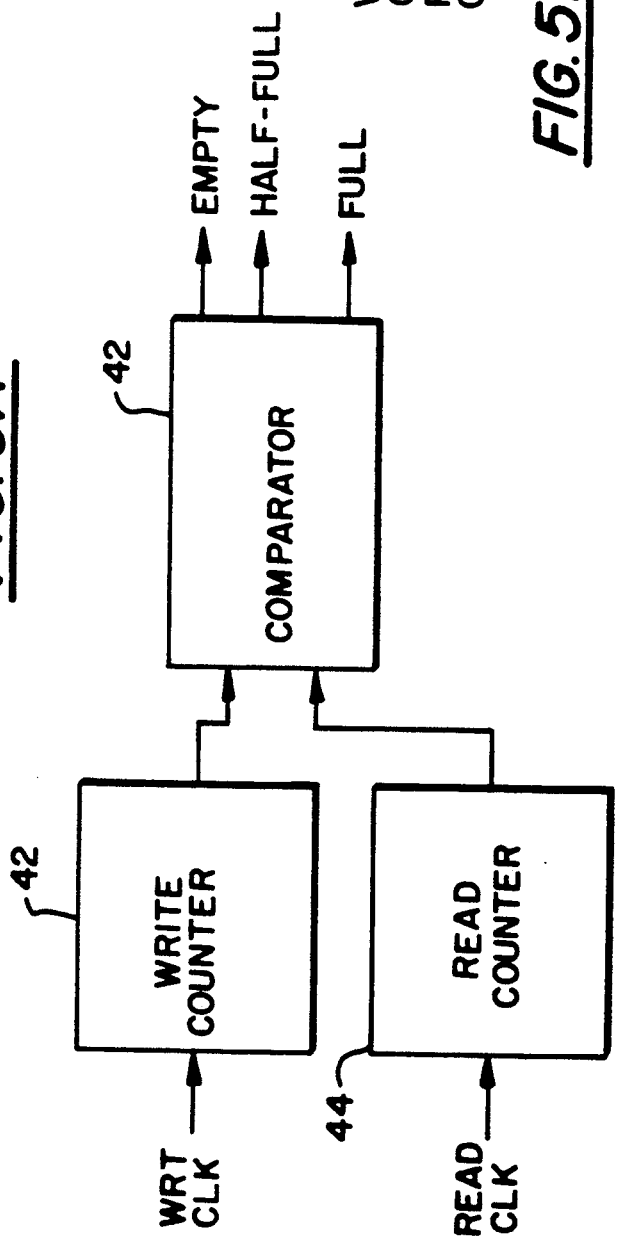

FIG. 5A illustrates a flag generator 34 for generating signals indicating certain particular states of the buffer memory. Among the conditions monitored by the flag generator is the empty condition (when no data has been written into the buffer memory or when all data elements written into the buffer memory have been read); the full condition (when all cells in the buffer memory have been written into and none of them has been read); and the half full condition (when more than half of the cells have been written into and none of them has been read). A write counter 42 is incremented by one for each write signal defining a write cycle and a read counter 44 is incremented by one for each read signal defining a read cycle. A comparator 46 compares the value in counter 42 with that in counter 44. If the difference is zero, then an empty condition is indicated by generation of an empty signal EMPTY; if the difference equals the total capacity of the buffer memory, then a full condition is indicated by generation of a full signal FULL; if the difference is more than half of the capacity of the buffer memory, then a half full condition is indicated by generation of a half full signal HFULL. In a further embodiment, the contents of the two counters are compared for an equal condition by a comparator, and the comparator further keeps track of the number of times the equal condition has been met; depending on that number, the memory array status is either less than half full or more than half full. Alternatively, the EMPTY, FULL, and HFULL flags may be generated through an up-down counter as shown in FIG. 5B. The up-down counter 48 counts in one direction in response to a write signal and in an opposite direction in response to a read signal. Thus, the counter output represents the number of data elements written into the buffer memory 2 and not yet read out. The counter output is connected to a comparator 50 which compares the counter output with predetermined values to generate the various conditions being monitored. These flags may be connected to the gating control logic 14 of FIG. 6 to implement special functions when respective monitored conditions of the buffer memory are met. Also, the flags may be outputted from the buffer memory.

Figure 6:
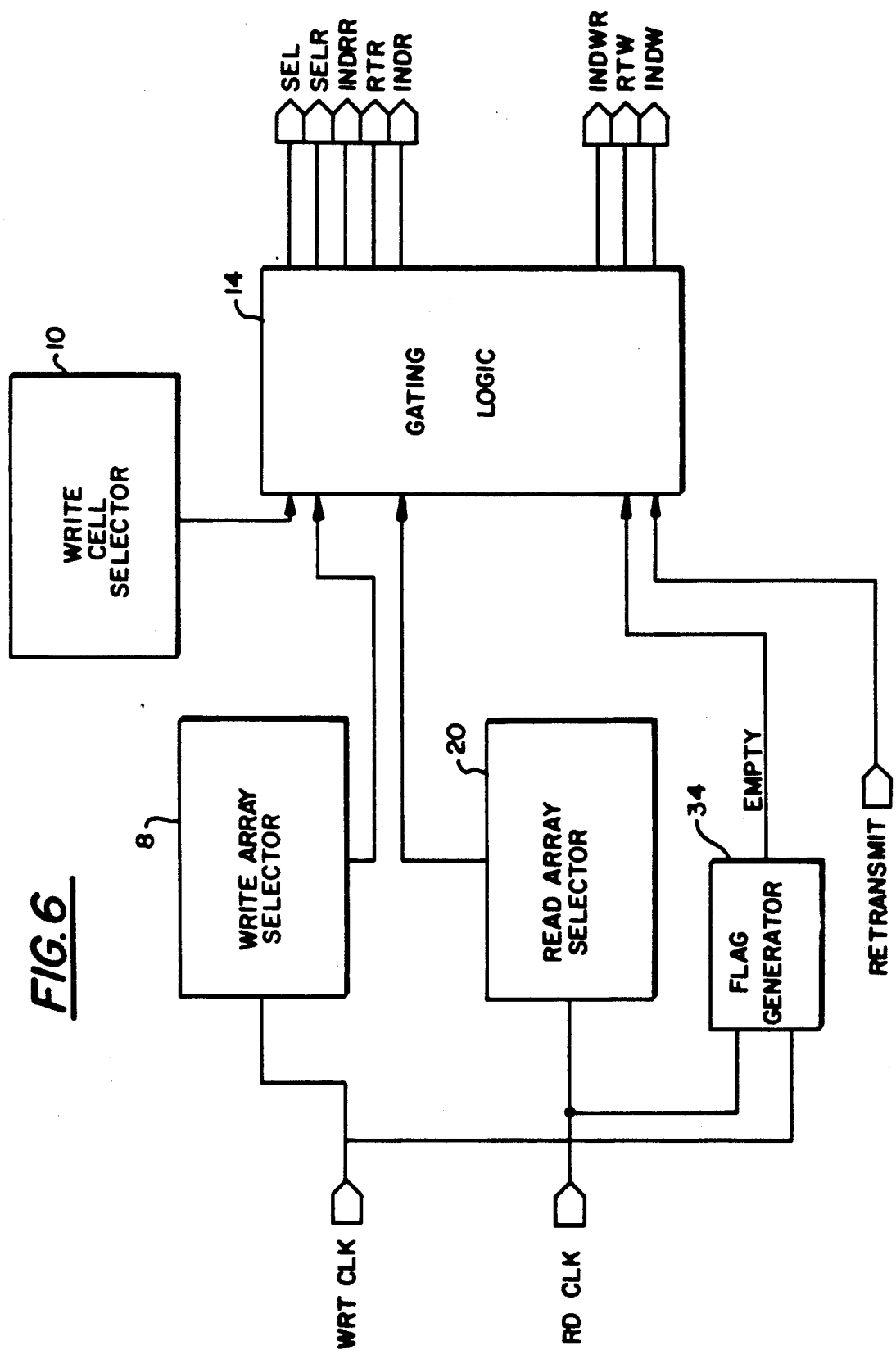
FIG. 6 illustrates a gating logic which provides control signals to the pass gates and the registers of FIG. 1.

FIG. 6 illustrates the sources of inputs to a gating logic 14 and the output signals provided by it. There are five sources of input signals to the gating logic 14: a line RETRANSMIT carrying an externally supplied retransmit signal, the write array selector 8 (there are actually two input lines, one for designating the left array and the other for designating the right array, but only one is shown for designating the source), the read array selector 20 (there are actually two input lines, one for designating the left array and the other for designating the right array, but only one is shown for illustrating the source), the write cell selector 10 associated with the left array 4 (assuming the left array is the array to store the first data element written into the memory), and an EMPTY signal line from the flag generator 34 previously described in connection with FIGS. 5A and 5B. There are eight output signals from the gating logic; five of them are sent to the pass gates 26 to select a particular output by opening and closing appropriate pass gates: SEL (Select Left—the data from the output line of the sense amplifier associated with the left array is to be gated to the output pad); SELR (Select Right—the data from the output line of the sense amplifier associated with the right array is to be gated to the output pad); INDR (Initial Data Register Read—the data in the initial data register connected to the left array is to be gated to the output pad); INDRR (Initial Data Register Read Right—the data in the initial data register connected to the right array is to be gated to the output pad); RTR (Retransmit Read—the data in the retransmit register is to be gated to the output pad). The other three output signals from the gating logic 14 are: INDW (Initial Data Register Write—sent to the initial data register associated with the left array to enable it to receive a data element written into the buffer memory); INDWR (Initial Data Register Write Right—sent to the initial data register associated with the right array to enable it to receive a data element written into the buffer memory); and RTW (Retransmit Write—sent to the retransmit register to enable it to receive a data element written into the buffer memory).

In an alternative embodiment, an externally supplied start-up signal, or a power-up condition may replace the internally generated empty signal as an input to the gating logic 14. In that case, the gating logic would respond in the same manner as it would to an empty signal. In a further alternative, an externally supplied start-up signal, or a power-up condition may also serve as an input to the gating logic 14 in addition to the empty signal. In that case, the gating logic would be adapted to respond to that additional signal in the same manner it would to the empty signal.

Figure 7:
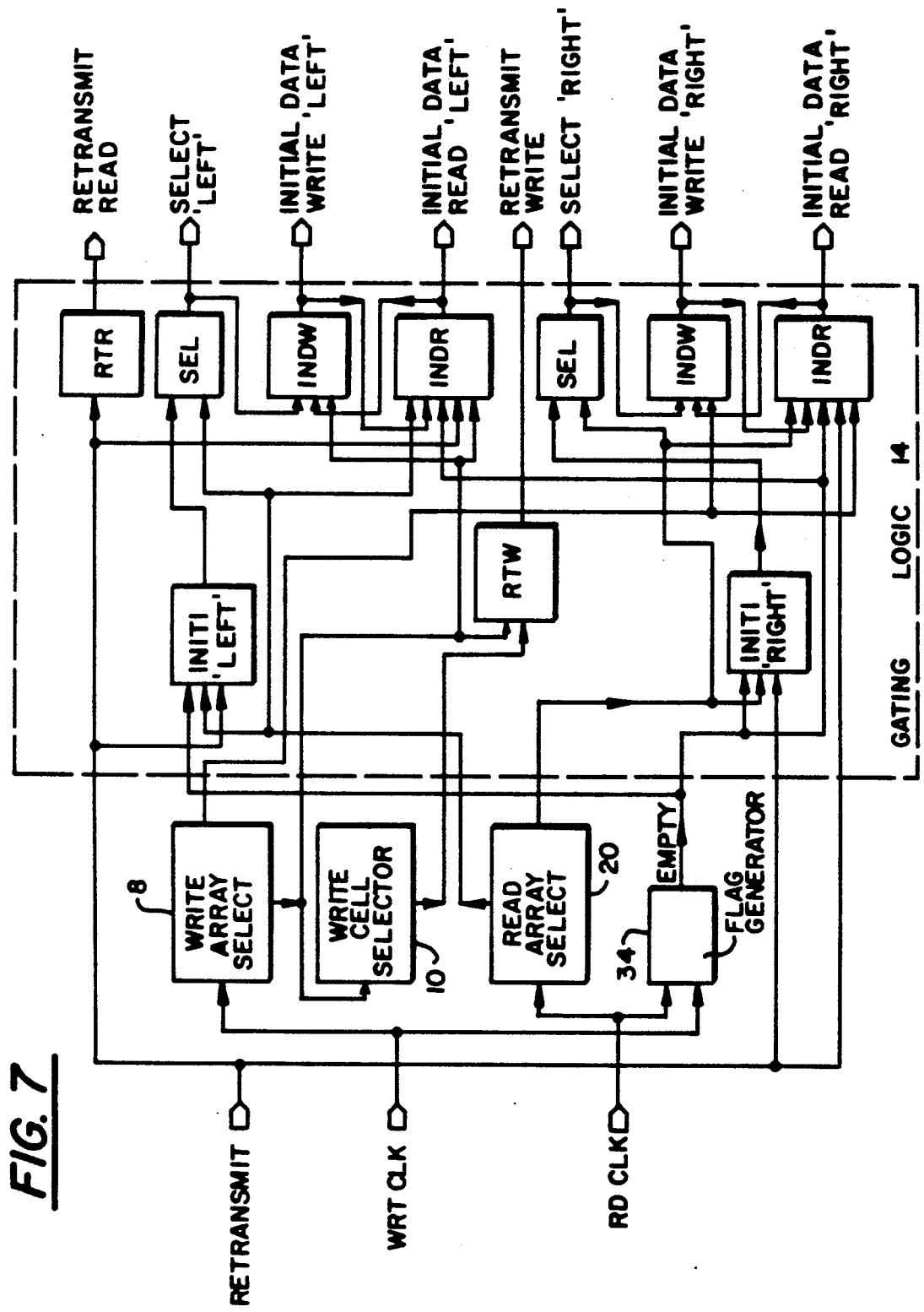
FIG. 7 illustrates the gating logic of FIG. 6 in more detail.

FIG. 7 illustrates an exploded view of the gating logic 14 shown in FIG. 6, together with its input connections and output lines. From the write array selector 8, the gating logic receives two inputs, L for designating the left array as the selected array, and R for designating the right array as the selected array. From the read array selector 20, it receives two inputs, L for designating the left array, and R for designating the right array. When the buffer memory is empty (when no data element has been written or when all data elements written have been read), the EMPTY signal from the flag generator 34 indicates that condition to the gating control logic 14. Upon that condition, the gating logic causes the next data element written into the memory to be received in an initial data register on the side of the memory array selected by the write array selector 8 (through either output signal INDW for the initial data register connected to the left array or INDWR for the initial data register connected to the right array). Also upon that condition, the gating logic causes the next data element to be outputted from the buffer memory to be from an initial data register containing the first data element written into the buffer memory subsequent to that empty condition (through either output signal INDR for the initial data register connected to the left array or INDRR for the initial data register connected to the right array).

The gating logic 14 is responsive to the write cell selector 10 of the left array—assuming that the first cell location in the buffer memory is in the left array—such that each time that first location is selected for writing a data element thereto, the gating logic causes the retransmit register to receive the data element to be written into that first cell, by outputting the signal RTW to the retransmit register; thus, the contents of the retransmit register is always updated to be the most recent data element stored in the first cell of the buffer memory—the one storing the first data element. When an externally supplied signal RETRANSMIT is inputted to the gating logic 14, the gating logic outputs the signal RTR (retransmit read) for causing the contents of the retransmit register to be gated by pass gates 26 to the output buffer 28 as shown in FIG. 1.

Based on the above description, the function of the connection between the write cell selector 10 and the gating logic circuit 14 is seen as one of timing. The retransmit register will be written into each time the first cell in the designated array is addressed. Write cell selector 10 serially selects all cells within the array—including the first cell—as discussed above with reference to FIGS. 2A-2C. The write cell selector 10 presets the gating logic circuit 14 which in turn, allows the retransmit register to store the first data element as the first cell is addressed.

Any of a number of appropriate circuits can tap row/column outputs of the write cell selector 10 to generate an appropriate timing signal for the RTW circuit. Before the first cell is addressed in a current cycle, the last cell was addressed in a previous cycle. The write selector may simply AND the last stage row shift register with the last stage column shift register. This ANDing function and the gate logic for the RTW circuit can be discerned in accordance with the Truth Table in FIG. 10E.

In the absence of the EMPTY signal and of the RETRANSMIT signal, the gating logic is responsive to select signals from the read array selector 20 to cause respective sense amplifier outputs to be gated to the output buffer in an alternating manner—first from one array, and then the other, then the one array, then the other, and so forth, through output signals SEL and SELR (SEL for the sense amplifier connected to the left array and SELR for the sense amplifier connected to the right array). The data gated to the output from a respective sense amplifier 18 as directed by the SEL or the SELR signal was already made available (latched) on a corresponding output line of that sense amplifier at the end of the previous read cycle. When the contents of either the retransmit register or one of the initial data registers is to be outputted, the gating logic inhibits the generation of SEL and SELR output signals in their normal course. The inhibition is accomplished through one INIT 1 circuit for the SEL signal and through another INIT 1 circuit for the SELR signal. Thus, INIT 1 circuits are for inhibiting the gating of data from an output line of respective sense amplifiers when the contents of either an initial data register or the retransmit register should be outputted. Even during that inhibition, however, the next data element is still being read from a memory cell as directed by other circuits illustrated in FIG. 1, and the data read placed on the output line of a corresponding sense amplifier.

As should be readily apparent from the above description, the block diagram of FIG. 7 and the corresponding truth table shown in FIG. 10D, a logic "0" output from the left and right INIT 1 circuits disable corresponding SEL signals. At this logic state, data cannot flow from a sense amplifier onto the data bus. Instead, data flows from the initial data register onto the data bus (if the FIFO was 'EMPTY'), or from the retransmit register onto the data bus (if in retransmit mode).

In the preferred embodiment, gating logic 14 is shown to include components INIT 1, RTR, SEL, INDW, INDR, SELR, INDWR, INDRR, and RTW, each of which is a combination including one-shots and/or latches. It should be noted that the gating logic can be any circuit which can appropriately generate the eight output signals from the five input signals. For the preferred embodiment disclosed herein, the functional input/output specifications of each sub-block are illustrated in the form of tables in FIGS. 10A through 10F. The tables are self-explanatory. However, two such tables, one for the RTR block and another for the SEL blocks will be described in text for illustration purposes. As illustrated in FIG. 10A, the RTR block outputs a RTR signal pulse responsive to the rising edge of a retransmit signal. As illustrated in FIG. 10B, each SEL block outputs a low SEL signal responsive to a low input from an INIT block connected thereto and a coincident rising edge of an input signal from the read array selector; and each SEL block outputs a pulse responsive to a high input from an INIT 1 block connected thereto and a coincident rising edge of an input signal from the read array selector. FIG. 10C is a table for the INDW blocks; FIG. 10D is a table for the INIT 1 blocks; FIG. 10E is a table for the RTW block; and FIG. 10F is a table for the INDR block.

Figure 8:
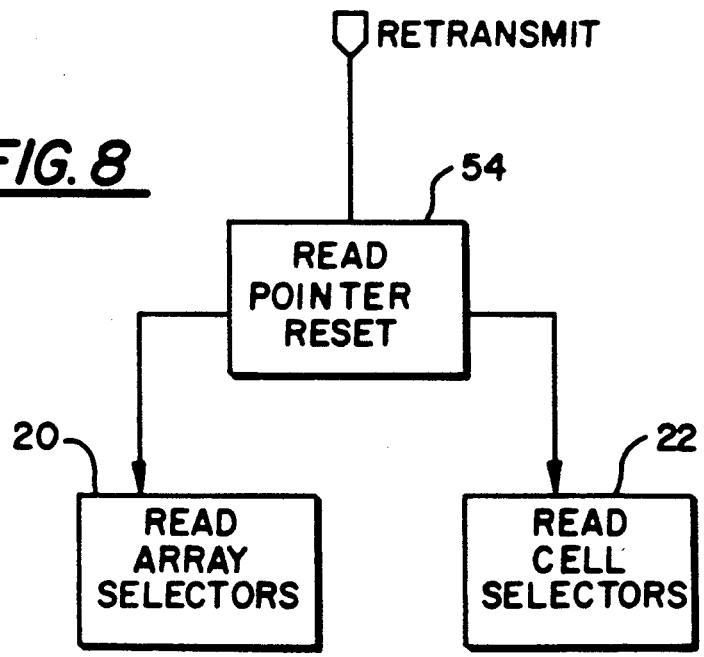
FIG. 8 illustrates a circuit responsive to a retransmit signal for resetting the read cell selector.

Upon a retransmit signal, the buffer memory prepares for a re-reading of the stored data elements, beginning from the first stored data element. Consequently, upon an externally supplied retransmit signal, the buffer memory reading sequence is returned to its initial state. Consequently, the read array selector and the read cell selectors must be reset to point to the first cell of the buffer memory, so that the reading sequence can be reset. That is accomplished in the preferred embodiment by a simple circuitry resetting the read array selector 20 and each read cell selector 22 of FIG. 1. To reset a read array selector or a read cell selector, the reset circuit simply places the read array selector or the read cell selector in its initial state as is shown in FIGS. 2A-2C. FIG. 8 shows a Read Pointer Reset circuit 54 connected to read array selectors 20 represented in one block and to read cell selectors 22 represented in one block. In a read cycle immediately following the resetting of a reading sequence, the gating logic 14 causes the content of the retransmit register to be outputted, rather than that of an initial data register. Accordingly, the content of the buffer memory is retransmitted responsive to subsequent read signals, in a pipelined manner as already discussed.

By operation of the gating logic 14 disclosed herein, when an Empty signal occurs and the READ CLK is low but the read array selector is not enabled, and a write cycle occurs, (write array selector is enabled), a data element being written in that cycle is outputted to the output buffer after completion of the write cycle, through an initial data register. When that occurs, the buffer memory is regarded as being placed in a flow-through mode.

Figure 9:
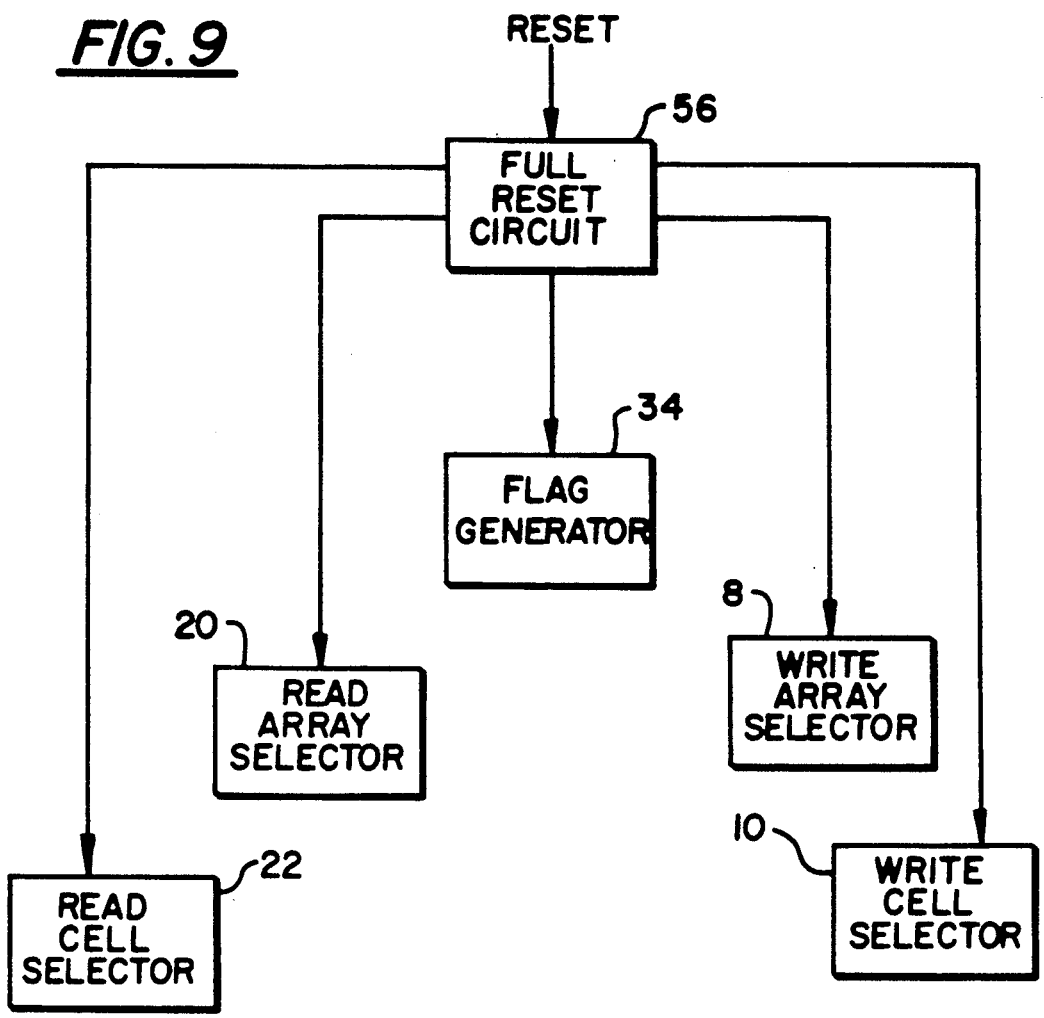
FIG. 9 illustrates a circuit responsive to a reset signal for resetting the read cell selector.

In an embodiment including an external reset feature, the buffer memory is responsive to an externally supplied reset signal to begin afresh, by resetting the write array selector 8, write cell selector 10, read array selector 20, read cell selector 22, and the write counter 42 and read counter 44 in the flag generator 34. Resetting of the write array selector, the write cell selector, the read array selector, and the read cell selector in response to the reset signal can be done in the same way the read array selector and the read cell selector are reset responsive to a retransmit signal. To reset the write and read counters of the flag generator 34, the respective counters are simply returned to their initial state by simple conventional circuitry. FIG. 9 illustrates a Full Reset circuit 56 receiving a reset signal and connected to the flag generator 34, the write array selector 8, the write cell selector 10, the read array selector 20, and the read cell selector 22.

As should also be readily apparent, all registers are re-initialized to a pre-determined value during power-up. The nine-bit counter in FIG. 2B, for example, may be initialized to output the value 01 hex. The shift registers in FIG. 2C may be initialized such that only one shift register outputs a value one (logic HIGH) to the next serial stage. Decoders generally do not require resetting. The details of the resetting operations are notoriously well known in connection with high-speed serial memory devices.

This invention is not limited to serial memories which enforce a FIFO sequence of writing and reading data. The pipelined look-ahead feature of this invention can be implemented on any serial memory wherein the stored data elements are outputted in a sequence defined by the order in which they were written into the serial memory, such as LIFO (last-in-first-out).

Those with ordinary skill in the art would recognize obvious variations of the circuits specifically disclosed above for achieving their respective functions. Those specific embodiments are intended for illustrative purposes only, and should not be construed to unduly limit the coverage as defined by the following claims.

We claim:

1. A memory device for alternately storing successive data elements which are input to said memory device and for alternately reading out said successive data elements in response to a series of write clock signals and a series of read clock signals, respectively, said successive data elements including an initial data element, a first data element and at least one subsequent data element, said memory device comprising:

first and second memory arrays each comprising a plurality of memory cells;

gating logic means for generating an initial data register write signal and an initial data register read signal in response to a first write clock signal and a first read clock signal, respectively, from the series of write clock signals and the series of read clock signals;

initial data register storing means for storing said initial data element in response to said initial data register write signal and for outputting the stored initial data element in response to said initial data register read signal;

write cell select means for selecting in response to a first write select signal, said first data element to be stored into a predetermined first cell of one of said first and second memory arrays, and for selecting, in response to a second write select signal, a first subsequent data element of said at least one subsequent data element to be stored into a predetermined first cell of the other of said first and second memory arrays;

write array select means coupled to said write cell select means for alternately generating said first and second write select signals in response to a second write clock signal and a third write clock signal, respectively, from said series of write clock signals;

read cell select means for selecting in response to a first read select signal, the first data element stored in the predetermined first cell of said one of said first and second memory arrays to be output therefrom, and for selecting, in response to a second read select signals, the first subsequent data element stored in the predetermined first cell of said other of said first and second memory arrays to be output therefrom;

read array select means for generating said first and second read select signals in response to said first read clock signal and a second read clock signal, respectively, from said series of read clock signals, said gating logic means being responsive to logic signals output by said read array means to further selectively generate first and second select signals; and first and second sense amplifier means responsive to said first and second select signals, respectively, for selectively sensing a data element output from a respective one of said first and second memory arrays one of the stored first data element and the stored first subsequent data element being gated to an output means from one of said first and second memory arrays, the gated data element having been previously sensed by the respective one of said first and second sense amplifier means during the previous read clock signal, said output means being coupled to said initial data register storing means and said gating logic means for selectively outputting the initial data element in response to the first read clock signal, for outputting the gated first data element in response to the second read clock signal, and for outputting the gated first subsequent data element in response to a third read clock signal.

2. A memory device as in claim 1, wherein said initial data register storing means includes first and second initial data registers, said first initial data register being associated with said first memory array and said second initial data register being associated with said second memory array, whereby said second memory array stores the first data element if the initial data element was first stored in the first initial data register, and said first memory array stores the first data element if the initial data element was first stored in the second initial data register.

3. A memory device as in claim 1 or 2, wherein said initial data element is stored in said initial data register storing means and also in one of said first and second memory arrays.

4. A memory device as in claim 1 or 2, wherein said initial data element is transmitted along a first data bus to said initial data register storing means, and wherein successive data elements, other than said initial data element, are transmitted along a second data bus to said first and second memory arrays, said first and second data buses not being connected.

5. A memory device as in claim 1 or 2, wherein said successive data elements are transmitted along a common bus to said initial data register storing means as well as to said first and second memory arrays.

6. A memory device as in claim 1 or 2, wherein said first and second sense amplifier means each include means for latching a data element output from a respective one of said first and second memory arrays, the latched data element being gated to the output means during the next read clock signal.

7. A memory device as in claim 1 or 2, wherein during the second read clock signal, while the first data element output from a respective one of said first and second memory arrays is being gated to the output means, the other of said first and second sense amplifier means senses the first subsequent data element stored in said other of said first and second memory arrays, the sensed first subsequent data element being gated to by the output means during the next read clock signal.

8. A memory device as in claim 1 or 2, wherein the memory device is formed on a single integrated circuit chip.

9. A memory device as in claim 1 or 2, wherein said memory device is a first-in-first-out memory.

10. A memory device as in claim 9, further comprising flag generator means, coupled to said gating logic means, for indicating a memory empty condition of said memory device.

11. A memory device as in claim 9, further comprising flag generator means, coupled to said gating logic means, for indicating a memory full condition of said memory device.

12. A memory device as in claim 9, further comprising retransmit register means, coupled to said gating logic means, for retransmitting, in response to an externally supplied retransmit signal, at least one data element most recently output from the output means.

13. A method for alternately storing successive data elements into a memory device comprising first and second memory arrays and for alternately reading out said successive data elements in response to write clock signals and read clock signals, respectively, said successive data elements including an initial data element, a first data element and at least one subsequent data element, said method comprising the steps of:

generating an initial data register write signal in response to a first write clock signal;

storing said initial data element, in response to said initial data register write signal, in an initial data register storing means;

generating a first write select signal in response to a second write clock signal;

writing said first data element into a predetermined first cell in one of said first and second memory arrays in accordance with said first write select signal;

generating a second write select signal in response to a third write clock signal;

writing a first subsequent data element of said at least one subsequent data element, into a predetermined first cell in the other of said first and second memory arrays; in accordance with said second write select signal;

outputting the initial data element stored in said initial data register storing means in response to a first read clock signal;

generating a first read select signal in response to said first read clock signal;

sensing the predetermined first cell in said one of said first and second memory arrays which stores the first data element in response to said first read select signal;

selectively gating to an output means, from one of a first and second sense amplifier means associated with and coupled to said one of said first and second memory arrays, the first data element stored in the predetermined first cell in said one of said first and second arrays which stores the first data element in response to a second read clock signal;

generating a second read select signal in response to said second read clock signal;

sensing the predetermined first cell in said other of said first and second memory arrays which stores the first subsequent data element in response to said second read select signal; and selectivity gating to the output means, from the other of said first and second sense amplifier means associated with and coupled to said other of said first and second memory arrays the first subsequent data element stored in the predetermined first cell in the other of said first and second arrays which stores the first subsequent data element in response to a third read clock signal.

14. The method of claim 13, wherein said initial data register storing means includes first and second initial data registers, said first initial data register being associated with said first memory array and said second initial data register being associated with said second memory array, and said step of writing the first data element includes the steps of first determining in which one of the first and second memory arrays the stored initial data element is stored and then storing the first data element in the other of the first and second memory arrays.

15. The method of claim 13 or 14, wherein the memory device is a first-in-first-out (FIFO) memory, and the steps of sensing each include the step of determining whether a memory empty condition is reached.

16. The method of claim 13 or 14, wherein the memory device is a first-in-first-out (FIFO) memory, and the steps of writing said first data element and writing said first subsequent data element each include the step of determining whether a memory full condition is reached.

17. The method of claim 13 or 14, wherein the step of storing the initial data element in said initial data register storing means further includes the step of writing the initial data element in a predetermined cell of one of said first and second memory arrays.

* * * * *